2,952,427
JETTISONABLE FUEL TANK

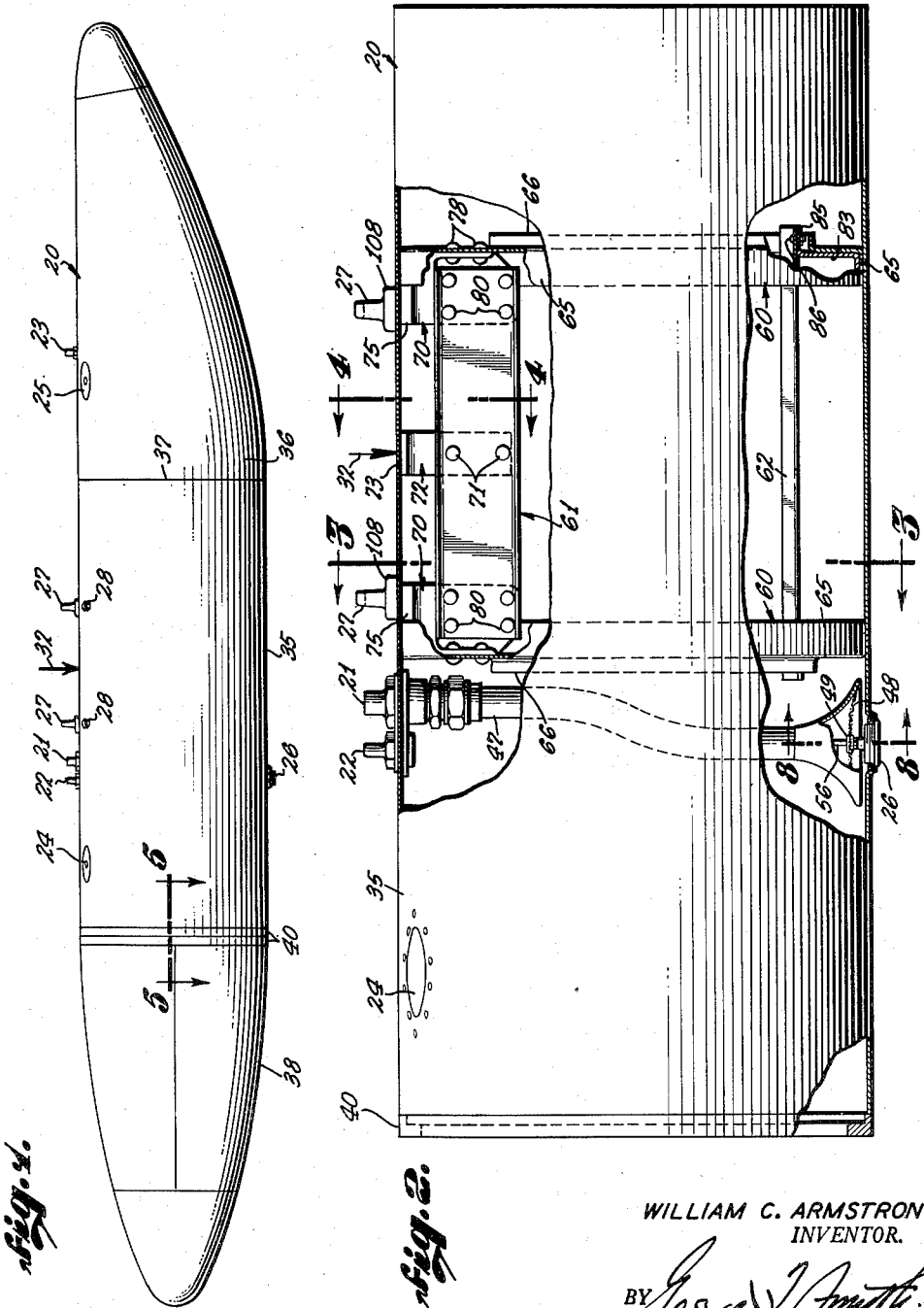

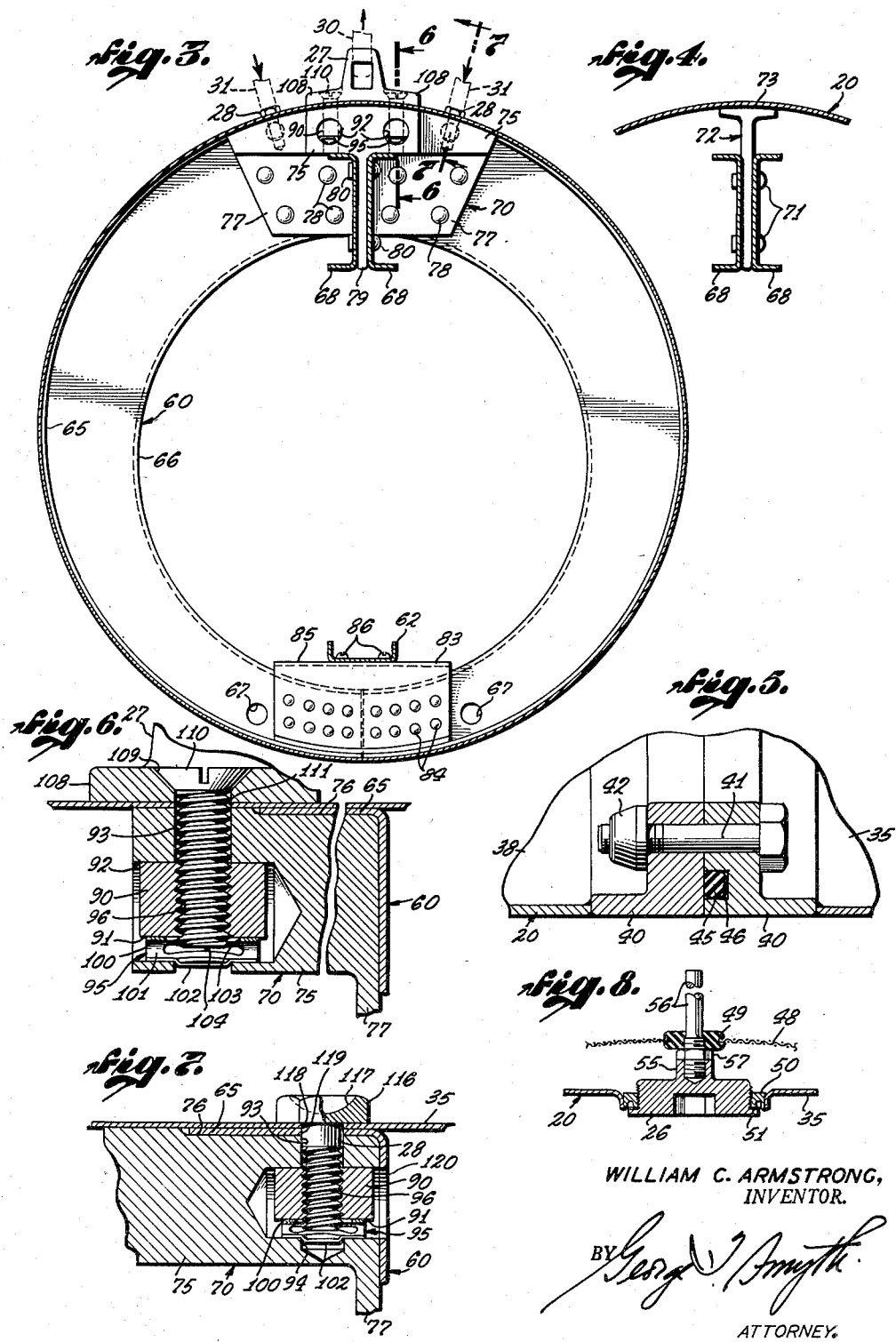

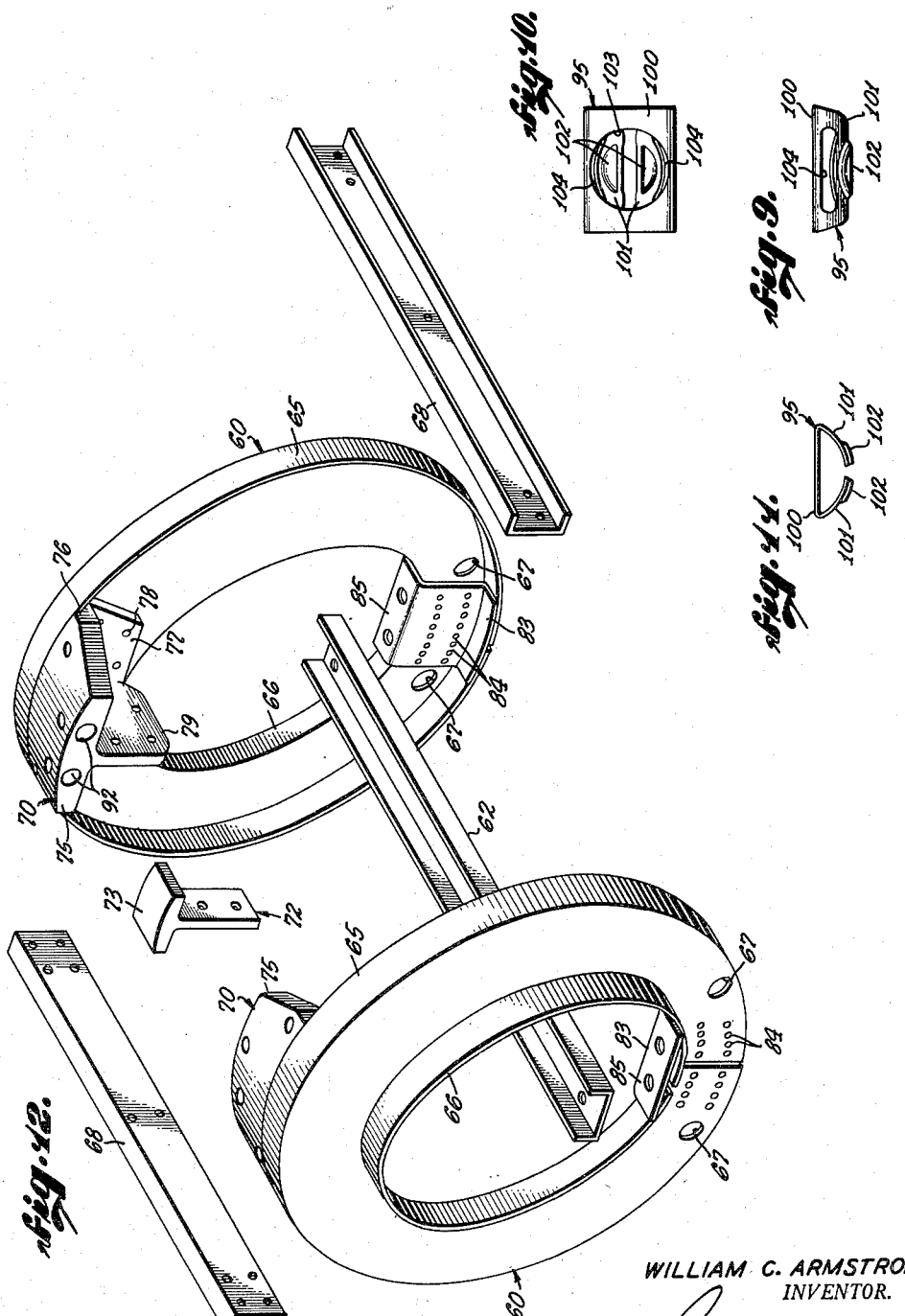

William C. Armstrong, Redondo Beach, Calif., assignor to Pastushin Aviation Corporation, Los Angeles, Calif., a corporation Filed Apr. 5, 1954, Ser. No. 420,950

10 Claims. (Cl. 244—135)

This invention relates to a jettisonable fuel tank that is adapted for releasable attachment to an aircraft and to receive ejective force for abrupt separation from the aircraft. Such a disposable fuel tank has mounting means at spaced attachment points thereon for releasable engagement by the aircraft and the aircraft is usually equipped with sway brace means for pressure contact with the tank at pressure points thereon spaced laterally on each side of the attachment points. When the tank is released, the ejective force is applied in a region between the attachment points. The ejective force, which is both powerful and abrupt, may be generated by the detonation of an explosive charge against the inner end of an ejection piston, the outer end of the piston being in abutment against the tank.

Such a tank should of course, be relatively light to add as little weight as possible to the fuel load and should be of relatively inexpensive construction since it is discarded as soon as it is empty. These considerations, taken alone, would lead to a tank structure consisting of a simple light sheet metal shell. It is of paramount importance, however, that the tank withstand without leakage all of the stresses incurred in flight, and these stresses may be of exceedingly high magnitude, especially on an aircraft of the jet fighter type. All of such stresses are necessarily concentrated, since they are transmitted to the tank solely at the points of releasable attachment to the aircraft. It is also of paramount importance that the tank react bodily to the ejective force instead of locally and here again the stresses involved are concentrated.

These further considerations of stress concentration make a simple shell structure impractical. In the first place, the shell tends to tear at the points of releasable attachment to the aircraft when the aircraft is rapidly accelerated and decelerated as well as when the aircraft abruptly changes direction. In the second place, when the ejective force is applied, the shell tends to rupture or crumple locally, instead of being thrown bodily away from the aircraft. It has been found, therefore, that reinforcement structure is necessary to withstand these forces incurred both in flight and in the ejection operation. It has been further found that mere local reinforcement is not adequate. The required degree of reliability and safety can be achieved only if the reinforcement structure added to the shell is effective to distribute the incurred stresses widely both longitudinally and circumferentially of the shell.

It is further desirable to take into consideration the air resistance of the tank since the tank is carried in the air stream externally of the aircraft. It is highly desirable that the tank be of a streamlined configuration with a smooth unbroken external surface. For this reason, the reinforcement structure should be housed entirely within the sheet metal shell of the tank.

The present invention meets these various requirements by the combination of a sheet metal tank shell with a unitary internal reinforcement frame. The reinforcement frame is constructed and arranged to receive all of the stresses incurred in flight as well as all of the stresses involved in the ejection of the tank from the aircraft and the reinforcement frame is adapted to distribute these various stresses, both longitudinally and circumferentially of the shell. For this purpose, the internal frame comprises a pair of longitudinally spaced rings interconnected at spaced points thereof by longitudinal frame elements. The mounting means for releasable attachment of the fuel tank to the aircraft are anchored to this internal frame and preferably pressure pads for co-operation with the sway brace means on the aircraft are also anchored to the internal frame so that all of the stresses incurred in flight are distributed through both of the rings to the entire circumference of the shell. The longitudinal frame elements which interconnect the two rings include a longitudinal beam structure just inside the upper wall of the shell to receive the impact of the ejective force. Here again, the force is distributed through the two rings to the entire circumference of the tank shell.

A feature of the preferred embodiment of the invention is that the two longitudinally spaced rings are made of sheet material and are of relatively great radial dimension. Thus, the two rings in addition to functioning as frame members function as bulkhead baffles to reduce surge in the liquid fuel load during flight.

An important feature of the invention is the use of fittings in the longitudinal beam structure for connection to the two bulkhead rings of the internal reinforcement frame, which fittings are formed with relatively thick walls for anchorage of both the mounting means and the sway brace pads. The relatively thick walls conform to the internal configuration of the shell, and are in reinforcement contact with the inner surface of the shell. It is contemplated that these fittings will permit the mounting means and the sway brace pads to be attached to the tank by operations performed entirely outside the tank, and for this purpose the fittings incorporated in the reinforcement frame inside the tank provide suitable threaded bores accessible from the outside through the tank shell. In the preferred practice of the invention, these internal frame fittings are made of relatively light metal and the desired threaded bores are provided by special inserts of relatively tough metal.

In the preferred practice of the invention, the internal frame fittings are T-shaped in cross-sectional configuration, being formed with downwardly extending longitudinal flanges, and the longitudinal beam structure comprises a pair of elements, such as channel members, which are attached at their ends to the opposite faces of the longitudinal fitting flanges. Preferably, the preferred practice of the invention is also characterized by the use of a pad member mounted between these two longitudinal channel members. The pad member has a surface curved to fit against the inner surface of the tank shell in the region of application of the ejective force, and serves to transmit the ejective force to the pair of longitudinal channel members which, in turn, are connected to the internal frame fittings for transmission of the ejective force to the two spaced bulkhead rings.

The preferred practice of the invention is further characterized by the use of split bulkhead rings with splice plates at the split ends of the rings and with the splice plates of the two rings interconnected by longitudinal frame elements. Preferably, the splice plates are of angular configuration and are interconnected by a single longitudinal tie element such as a relatively light channel member. This tie element is at the bottom of the internal frame structure so that it tends to be stressed in tension in reaction to the application of ejective force against the upper longitudinal beam structure.

In the preferred embodiment of the invention, the fuel tank is made in two sections that are releasably connected together end to end. Such a construction has the advantage of permitting the tank to be shipped in knocked-down state and has the further advantage of permitting the tank to be taken apart in the field when access to the interior of the tank is necessary. The two tank sections have suitable internal rings at their juncture which are interconnected by bolts and all of the bolts are accessible through a hand hole in which a fill plug is normally mounted.

The various features and advantages of the invention will be apparent in the following description, considered with the accompanying drawings.

In the drawings, which are to be regarded as merely illustrative:

Figure 1 is a side elevation of a fuel tank embodying the presently preferred form of the invention;

Figure 2 is a side elevation on an enlarged scale of a central portion of the tank with parts broken away to reveal concealed structure;

Figure 3 is a transverse section, taken as indicated by the line 3—3 of Figure 2;

Figure 4 is a fragmentary transverse section, taken as indicated by the line 4—4 of Figure 2;

Figure 5 is an enlarged sectional detail in the region of the line 5—5 in Figure 1;

Figure 6 is a fragmentary section taken as indicated by the line 6—6 of Figure 3, to show how one of the mounting means may be anchored to the internal frame;

Figure 7 is a fragmentary section taken as indicated by the line 7—7 of Figure 3 to show how a sway brace pad in the form of a bolt may be anchored to the internal frame;

Figure 8 is an enlarged detail of a portion of the tank within the line 8—8 of Figure 2;

Figure 9 is a side elevation of a special spring clip that may be used in the internal frame;

Figure 10 is a plan view of the clip;

Figure 11 is an end elevation of the clip; and

Figure 12 is an exploded view of the internal reinforcement frame.

As shown in Figure 1, the fuel tank may have a lightweight sheet metal shell or skin, generally designated by numeral 20, provided with various fittings which may include: a fuel line connection fitting 21; a vent fitting 22; a check-valve fitting 23 that opens in response to predominance of external pressure; two filler plugs 24 and 25; a drain plug 26 at the bottom of the tank; two spaced mounting means 27 in the form of shackle fittings formed with loops or eyes for releasable engagement by hook means on the aircraft; and sway brace pads 28, there being two sway brace pads 28 positioned on opposite sides of each of the mounting means. Figure 3 indicates in dotted lines how hook means 30 on the aircraft may engage each of the mounting shackles 27 to exert upward force thereon and how sway brace means 31 on the aircraft may engage each of the sway brace pads 28 to exert counter downward force. The arrow 32 in Figure 1, and again in Figure 2, indicates where ejective force is applied to throw the empty fuel tank away from the aircraft.

In the selected embodiment of the invention, the shell 20 has a central cylindrical portion 35, a tapering rear portion 36 that is connected to the central portion by a circumferential weld 37, and a forward or nose portion 38 that is removably connected with the central cylindrical portion. The joint between the nose portion 38 and the central cylindrical portion 35 is formed by two rings 40 which, as shown in Figure 5, are of angular cross-section and abut for interconnection by suitable bolts 41 and nuts 42. This joint between the two tank sections 35 and 38 may be sealed by a suitable O-ring 45 mounted in a circumferential groove 46 in one of the two rings 40. As shown in Figure 1, this joint between the two tank sections is near the forward filler plug 24 and it is contemplated that the filler plug may be removed to provide a hand hole for access to the various bolts 41 whenever it is desired to connect or disconnect the two tank sections.

As shown in Figure 2, the fuel line fitting 21 is at the upper end of a fuel discharge tube 47 that terminates at slight spacing above the bottom of the tank. The lower end of the tube 47, which is bell-shaped, carries a bowed strainer 48, in the middle of which is mounted a suitable grommet 49 of rubber-like material. As best shown in Figure 8, the drain plug 26, which screws into a suitable outlet fitting 50, carries a sealing gasket 51 and is formed with an inner axial extension 55. The axial extension 55 of the drain plug is internally threaded to receive and mount an upright pin 56. The lower threaded end of the pin 56 carries a lock nut 57 which may be tightened to make the pin rigid on the drain plug. The pin 56 extends through the grommet 49 for the purpose of bracing the lower end of the fuel discharge tube 47.

The internal reinforcement frame includes two ring members 60 which are preferably in the form of bulkhead rings and the frame includes suitable longitudinal elements that interconnect the two bulkhead rings at spaced points thereof. In the present embodiment of the invention, the interconnecting elements that join the two bulkhead rings 60 together comprise an upper longitudinal beam structure generally designated 61 and a lower interconnecting element 62 in the form of a channel member.

As best shown in Figure 12, each of the two bulkhead rings 60 may be of substantial radial dimension relative to the diameter of the tank so that the two rings serve as annular baffles to reduce the surge of the liquid fuel carried by the tank. Preferably each of the two bulkhead rings 60 is formed with an outer circumferential flange 65 to fit against the inner surface of the tank shell 20 and is formed with an inner circumferential stiffening flange 66, the inner stiffening flanges being turned outward away from each other. The bulkhead rings 60 are provided with suitable apertures 67 adjacent the bottom of the tank to permit free drainage of residual fuel through the bulkhead rings to the region of the fuel discharge tube 47.

The upper beam structure 61 may comprise a pair of spaced parallel channel members 68, positioned back-to-back, and a pair of special fittings 70 which connect the ends of the channel members 68 with the two bulkhead rings 60. Mounted between the two channel members 68 and connected thereto by suitable rivets 71, is a special T-shaped pad member 72 which has an upper surface 73 curved to conform to the inner curvature of the shell 20. The special pad member 72 is in close contact with the shell 20 in the region of the arrow 32 that represents the application of the ejective force against the tank when the tank is jettisoned by the aircraft.

It is contemplated that each of the special fittings 70 will have a relatively thick wall portion 75 that is curved to conform to the internal curvature of the shell 20 and is cut away as shown at 76 in Figures 6 and 7 to seat the outer flanges 65 of the rings 60. The thick wall portions 75 lie against the inner surface of the shell to provide anchorage for the mounting shackles 27 and preferably also provide anchorage for the sway brace pads 28. It is apparent that special fittings for this purpose may take various shapes and be of various construction in various practices of the invention.

In the present embodiment of the invention, each of the special fittings 70 is formed with an inner lateral flange 77 that is connected to the corresponding bulkhead ring 60 by suitable rivets 78 and the fitting is also formed with a downward longitudinal flange 79 that is integral with the lateral flange 77. The two channel members 68 are attached at their opposite ends to the opposite sides of the longitudinal flanges 79 of the two special fittings 70 by means of suitable rivets 80. It can be seen that the special fittings 70 serve as efficient structural elements for rigidly connecting the two channel members 68 to the two bulkhead rings 60.

Preferably the two bulkhead rings 60 are of split construction with the split ends of the rings at the bottom of the tank. The split ends of each bulkhead ring 60 may be interconnected by a splice plate 83 that is attached thereto by multiple rivets 84. In the present construction, both of the splice plates 83 are of angular configuration, being formed with upper flanges 85 to which the opposite ends of the lower longitudinal channel 62 are connected by suitable screws 86.

A feature of the described construction of the internal reinforcement frame is that the frame may be fabricated and assembled separately from the tank shell 20 and installed in the intermediate cylindrical portion 35 of the shell after the sheet material of this intermediate portion is welded to form a circumferentially continuous skin. In the preferred assembly procedure, the split ends of the two bulkhead rings 60 are not interconnected by the splice plates 83 when the reinforcement frame is inserted into the shell of the tank although each of the splice plates 83 may be riveted to one of the ends of the corresponding bulkhead ring. After the reinforcement frame has been inserted in correct position inside the shell 20, suitable means may be employed to apply force diametrically between the two legs of each of the bulkhead rings 60 to spread the two rings radially into pressure contact with the surrounding tank shell. While this expanding force is applied to each of the two bulkhead rings 60, the two bulkhead rings may be drilled and the necessary rivets 84 installed for interconnection of the split ends by the two splice plates 83. As a result of this procedure, the two bulkhead rings 60 are pre-stressed under permanent radial compression and the surrounding skin 20 of the tank is under corresponding permanent circumferential tension to unify the internal frame with the shell.

It is contemplated that each of the special fittings 70 of the internal reinforcement frame will be adapted for anchorage thereto of both the mounting shackles 27 and the sway brace pads 28 operations that may be performed entirely outside of the tank thus the mounting shackles and sway brace pads may be installed or may be replaced after the tank is fabricated and assembled. For this purpose, the special frame fittings 70 may provide outwardly directed threaded bores accessible from outside the tank for the mounting of the shackle fittings 27 and the sway brace pads 28. A feature of the present embodiment of the invention in this regard is the concept of making the special frame fittings 70 of relatively light metal such as aluminum or magnesium and of mounting inserts made of steel or other tough material in the special fittings, the inserts providing the required threaded bores.

As best shown in Figures 6 and 7, the inserts for this purpose may comprise semicylindrical steel bodies 90, commonly called barrel nuts, each of which has a longitudinal flat face 91. Each of the steel inserts is mounted in a corresponding horizontal bore 92 in the thick wall portion 75 of one of the special fittings 70. Each of the horizontal bores 92 that houses a steel insert 90 is intersected by a radial bore 93 with a portion 94 of the radial bore 93 extending radially inward from the horizontal bore as indicated in Figures 6 and 7. The inner portion 94 of the radial bore 93 serves as a seat for a special spring retainer, generally designated 95, that is illustrated by Figures 9, 10 and 11. Each of the steel inserts 90 has a diametrical bore 96 of somewhat smaller diameter than the corresponding radial bore 93, this diametrical bore being formed with screw threads as shown to receive screw means that will freely slide into the radial bore 93.

Each of the spring retainers 95, which is of a well-known construction, comprises a piece of sheet spring metal having a flat portion 100 and two arcuate flanges 101, the flat portion 100 being dimensioned to rest against the flat face 91 of a steel insert 90 and the arcuate flanges 101 being shaped and dimensioned to fit the horizontal bore 92 adjacent a steel insert. The two arcuate flanges 101 are formed with curved offsets 102 to seat in the inner extended portions 94 of the radial bores 93 and the flat portion 100 of the spring retainer is formed with a relatively large circular aperture 103 to register with the threaded diametrical bore 96 of the steel insert. Each of the two arcuate flanges 101 is formed with a longitudinal aperture 104 for the sake of increased resiliency.

It is apparent that with a steel insert 90 first inserted into a horizontal bore 92, a spring retainer 95 may then be forced into the horizontal bore to snap into engagement with the extended portion 94 of the corresponding radial bore 93 and that the spring retainer will seat in the extended bore to prevent such rotation of the steel insert that would carry the diametrical threaded bore 96 of the steel insert out of radial alignment with the corresponding radial bore 93. The friction created by the pressure of the spring retainer 95 against the steel insert will tend to immobilize the insert against longitudinal movement, but nevertheless will permit the steel insert to be shifted longitudinally if necessary for registering the diametrical threaded bore 96 of the steel insert with the radial bore 93.

As best shown in Figure 3, each of the shackle fittings 27 has an arcuate base portion 108 that rests against the curved outer surface of the skin 20 in the region of a special frame fitting 70. The base portion 108 of the mounting shackle 27 has a pair of countersunk bores 109 (Figure 6) to receive suitable screws 110 and the tank shell 20 has corresponding apertures 111 to permit the screws to be inserted into radial bores 93. The two screws 110 thread tightly into the corresponding steel inserts 90 for rigid anchorage of each shackle fitting 27 in the corresponding special frame fitting 70.

As best shown in Figure 7, each of the sway brace pads 28 may be in the form of a special screw having a hexagonal head 116 which is dished or formed with a spherically curved recess 117 to seat the corresponding sway brace element 31 (Figure 3). The shell 20 of the tank has apertures 118 and the outer circumferential flanges 65 of the bulkhead rings 60 have corresponding apertures 119 to permit the special screws or sway brace pads 28 to be inserted into the corresponding radial bores 93 of the fittings 70 for engagement with the threaded diametrical bores 96 of the corresponding steel inserts 90. Each of the bulkhead rings 60 may have apertures 120 to permit the steel inserts 90 for the sway brace screws 28 to be inserted after the special frame fittings 70 are assembled to the bulkhead rings.

The manner in which the described fuel tank construction serves the purpose of the invention in meeting the previously described special requirements for a jettisonable fuel tank may be readily appreciated from the foregoing description. It is apparent that the tank may be shipped in two sections for assembly at the point of use. The fuel discharge tube 47 may be shipped separately and installed at the point of use if desired. It is a simple matter to join the two tank sections together in the field, since the two joint rings 40 are readily accessible through the hand hole provided by the filler plug 24 for installation of the bolts 41 and nuts 42. In like manner, if it is necessary to make the interior of the assembled tank fully accessible, the bolts and nuts 42 may be reached through the hand hole provided by the filler plug 24 for complete disconnection of the two tank sections.

The shackle fittings 27 and the sway brace screws 28 may be installed in the field after the two tank sections are interconnected since the threaded diametrical bores 96 of the various steel inserts 90 will be readily accessible from the exterior of the tank. The spring retainers 95 hold the steel inserts against rotation. If the diametrical threaded bore 96 of a steel insert 90 is out of alignment with the corresponding radial bore 93 because of longitudinal displacement of the steel insert, the steel insert may be readily shifted to its correct position by inserting a suitable prying tool such as a screw driver through the corresponding radial bore 93 from outside the tank.

It can be seen that all stresses incurred by forces transmitted to the shackle fittings 27 by acceleration of the aircraft, deceleration of the aircraft, and changes in direction of the aircraft, will be transmitted by the shackle fittings and the corresponding screws 110 directly to the special frame fittings 70 and will be distributed longitudinally and circumferentially of the shell 20 by the internal reinforcement frame. In like manner, stresses created by the application of an ejective force, represented by the arrow 30 in Figures 1 and 2, will be received by the special pad member 72 for transmission directly to the longitudinal beam structure 61 and will thereby also be distributed longitudinally and circumferentially of the shell 20.

The selected embodiment of the invention has been described in specific detail by way of example and to illustrate the principles involved. It will be apparent to those skilled in the art that various modifications, substitutions and other departures from the disclosure may be made within the spirit and scope of the appended claims.

I claim:

1. In a jettisonable fuel tank for releasable attachment to an aircraft at spaced attachment points on the tank and for separation from the aircraft by ejective force applied to the tank at a point intermediate said spaced points, the combination of: a tank shell made of sheet material; a pair of longitudinally spaced rings; a pair of spaced fittings between said rings connected to the upper portions of the rings respectively in the region of said spaced attachment points, each of said fittings having a relatively thick wall with an upper surface that is contiguous to the inner surface of said tank shell and is curved to conform therewith; longitudinal means interconnecting said rings to form therewith a unitary frame internally reinforcing said shell, said longitudinal means including longitudinal structure interconnecting said fittings, said longitudinal structure being positioned at said intermediate point to transmit the ejective force to said rings through said fittings for distribution around the tank shell; and mounting means at said spaced points of the tank shell, said mounting means being anchored in said relatively thick walls of said two fittings.

2. A jettisonable fuel tank as set forth in claim 1 which includes external sway brace pads anchored in said relatively thick walls of said fittings.

3. A jettisonable fuel tank as set forth in claim 1 which includes a pad member mounted on said longitudinal structure contiguous to the wall of the shell at said intermediate point.

4. A jettisonable fuel tank as set forth in claim 1 in which said longitudinal structure comprises two rigid members, each having relatively large vertical cross-section and relatively small horizontal cross-section.

5. A jettisonable fuel tank as set forth in claim 4 in which each of said fittings has a longitudinal flange and said rigid members are connected to the opposite faces of said flanges.

6. A jettisonable fuel tank as set forth in claim 5 which includes a pad member, said pad member being mounted between said two rigid members and being connected thereto with the pad contiguous to the wall of the tank shell at said intermediate point.

7. A jettisonable fuel tank as set forth in claim 1 in which each of said fittings has a downwardly extending longitudinal flange for connection to said longitudinal structure and a downwardly extending lateral flange for connection with the corresponding ring.

8. A jettisonable fuel tank as set forth in claim 7 in which said longitudinal structure comprises two rigid members, said two members being connected to the opposite faces of said longitudinal flange.

9. A jettisonable fuel tank as set forth in claim 8 which includes a pad member mounted between said two rigid members in contact with the inner surface of said shell at said intermediate point.

10. A jettisonable fuel tank for releasable attachment to an aircraft at spaced attachment points on the tank for stabilization by sway brace pressure by means on the aircraft against pressure points on the tank on both sides of said attachment points and for separation from the aircraft by ejective force applied to the tank at a point intermediate said spaced attachment points, said tank having in combination: a tank shell made of sheet material; a pair of longitudinally spaced bulkhead rings inside said tank shell in circumferential contact therewith, each of said rings being split at the bottom; a pair of spaced fittings between said rings connected to the upper portions of the rings respectively in the region of said spaced attachment points, each of said fittings having a relatively thick wall with an upper surface contiguous to said shell, each of said fittings having a downward longitudinal flange; a pair of longitudinal members interconnecting said fittings, said longitudinal members being attached respectively to opposite sides of said longitudinal flanges of the fittings; a pad member mounted between said longitudinal members in contact with said tank shell at said intermediate point; a splice member on each of said rings interconnecting the split ends thereof; means interconnecting said splice members; mounting means at said attachment points respectively on the shell for engagement by the aircraft to carry the tank, said mounting means being anchored in said fittings; and external sway brace pads at said pressure points on the tank shell, said sway brace pads being anchored in said fittings.

References Cited in the file of this patent

UNITED STATES PATENTS

| | | |
|---|---|---|
| 1,111,491 | Priebe | Sept. 22, 1914 |
| 1,844,530 | Thwaits | Feb. 9, 1932 |
| 2,036,607 | Robinson | Apr. 7, 1936 |
| 2,121,670 | Saives | June 21, 1938 |
| 2,225,779 | Hart-Still | Dec. 24, 1940 |
| 2,240,310 | McKay | Apr. 29, 1941 |
| 2,382,358 | Watter | Aug. 14, 1945 |
| 2,387,219 | Wallis | Oct. 16, 1945 |
| 2,552,119 | Scharenberg | May 8, 1951 |
| 2,591,913 | Bowers et al. | Apr. 8, 1952 |
| 2,596,139 | Fletcher | May 13, 1952 |
| 2,665,862 | Grill | Jan. 12, 1954 |

FOREIGN PATENTS

| | | |
|---|---|---|
| 483,588 | Canada | May 27, 1952 |